United States Patent
Varini

(10) Patent No.: US 12,372,082 B2
(45) Date of Patent: Jul. 29, 2025

(54) AUXILIARY DEVICE FOR PUMPS

(71) Applicant: PIUSI S.P.A., Suzzara (IT)

(72) Inventor: Otto Varini, Suzzara (IT)

(73) Assignee: PIUSI S.P.A., Suzzara (IT)

( * ) Notice: Subject to any disclaimer, the term of this patent is extended or adjusted under 35 U.S.C. 154(b) by 12 days.

(21) Appl. No.: 18/202,490

(22) Filed: May 26, 2023

(65) Prior Publication Data

US 2023/0383740 A1 Nov. 30, 2023

(30) Foreign Application Priority Data

May 27, 2022 (IT) .......... 102022000011156

(51) Int. Cl.
| | | |
|---|---|---|
| *F04B 49/02* | (2006.01) | |
| *F04B 49/06* | (2006.01) | |
| *F04B 51/00* | (2006.01) | |
| *G01F 1/10* | (2006.01) | |

(52) U.S. Cl.
CPC ............ *F04B 49/02* (2013.01); *F04B 49/065* (2013.01); *F04B 51/00* (2013.01); *G01F 1/10* (2013.01); *F04B 2203/0205* (2013.01); *F04B 2205/09* (2013.01)

(58) Field of Classification Search
CPC . G01F 1/10; G01F 1/115; G01F 15/07; F04D 15/0077; F04D 15/0088; F16K 37/005
See application file for complete search history.

(56) References Cited

U.S. PATENT DOCUMENTS

| | | | | |
|---|---|---|---|---|
| 8,347,427 B2 * | 1/2013 | Klicpera | ................ | B05B 12/12 4/643 |
| 10,049,565 B1 * | 8/2018 | McWhirter | ............ | G08C 17/02 |
| 2008/0017252 A1 * | 1/2008 | Varini | ................ | F04D 15/0236 137/392 |
| 2015/0315803 A1 * | 11/2015 | Hamza | ...................... | E04H 4/14 4/509 |
| 2017/0209338 A1 | 7/2017 | Potucek et al. | | |
| 2018/0335038 A1 | 11/2018 | Vestergaard Kragelund et al. | | |

OTHER PUBLICATIONS

Italian Search Report and Written Opinion dated Jan. 10, 2023 issued in IT 202200011156, with partial translation.
Endress + Hauser Australian, Launch of the Proline 10—uncompromisingly simple flow measurement, URL:https://www.youtube.com/watch?v=QwTQad4ivaE (Sep. 13, 2021).
Hunter Landscape Irrigation, Wireless HC Flow Meter Product Guide, URL:https://www.youtube.com/watch?v=5IGKYCKE14I (Jun. 15, 2021).
Australian Examination Report dated Nov. 26, 2024 received in Australian Application No. 2023203124.
Australian Examination Report dated Apr. 2, 2025 received in Australian Application No. 2023203124.

* cited by examiner

*Primary Examiner* — Kenneth J Hansen
(74) *Attorney, Agent, or Firm* — Scully, Scott, Murphy & Presser, P.C.

(57) ABSTRACT

An auxiliary device for pumps, comprising a device body which defines a conveyance duct, which can be connected to the delivery of a pump driven by an electric motor, and at least one accommodation portion for an electronic controller which is connected to at least one sensor for detecting at least one operating parameter correlated to the operation of the pump. The electronic controller is functionally connected to a short-range wireless communication unit which can be configured to communicate with to at least one mobile device operated by a user.

8 Claims, 4 Drawing Sheets

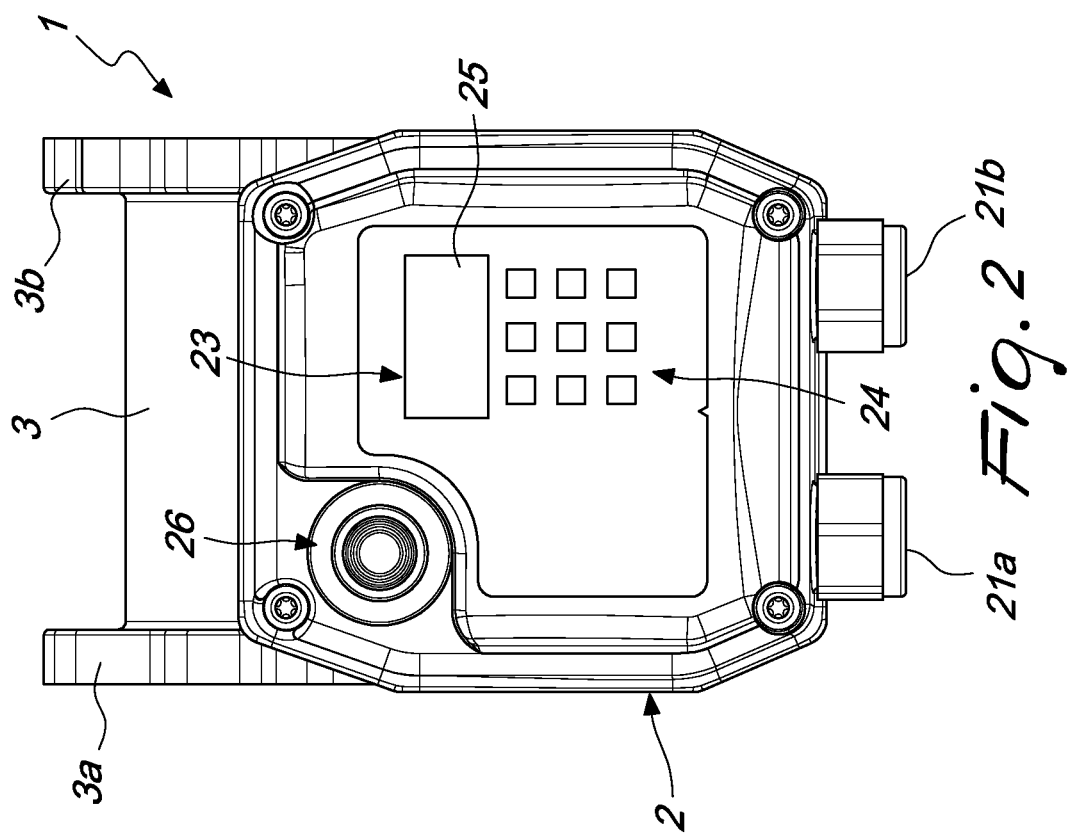
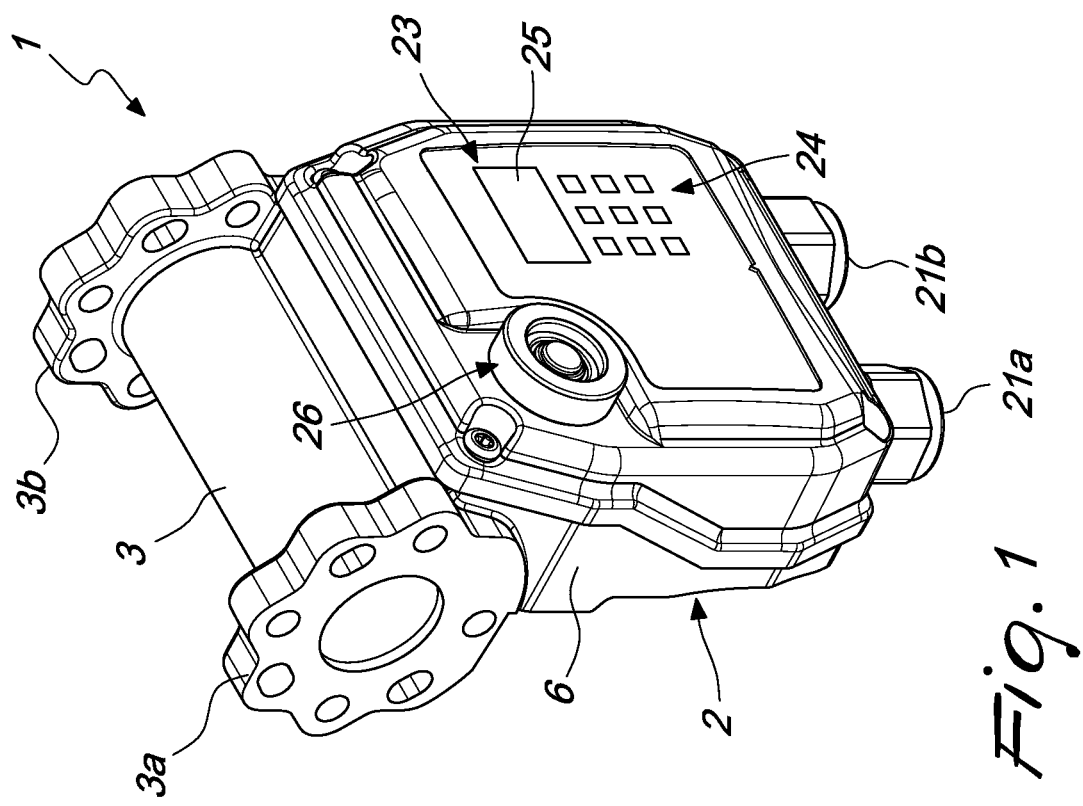

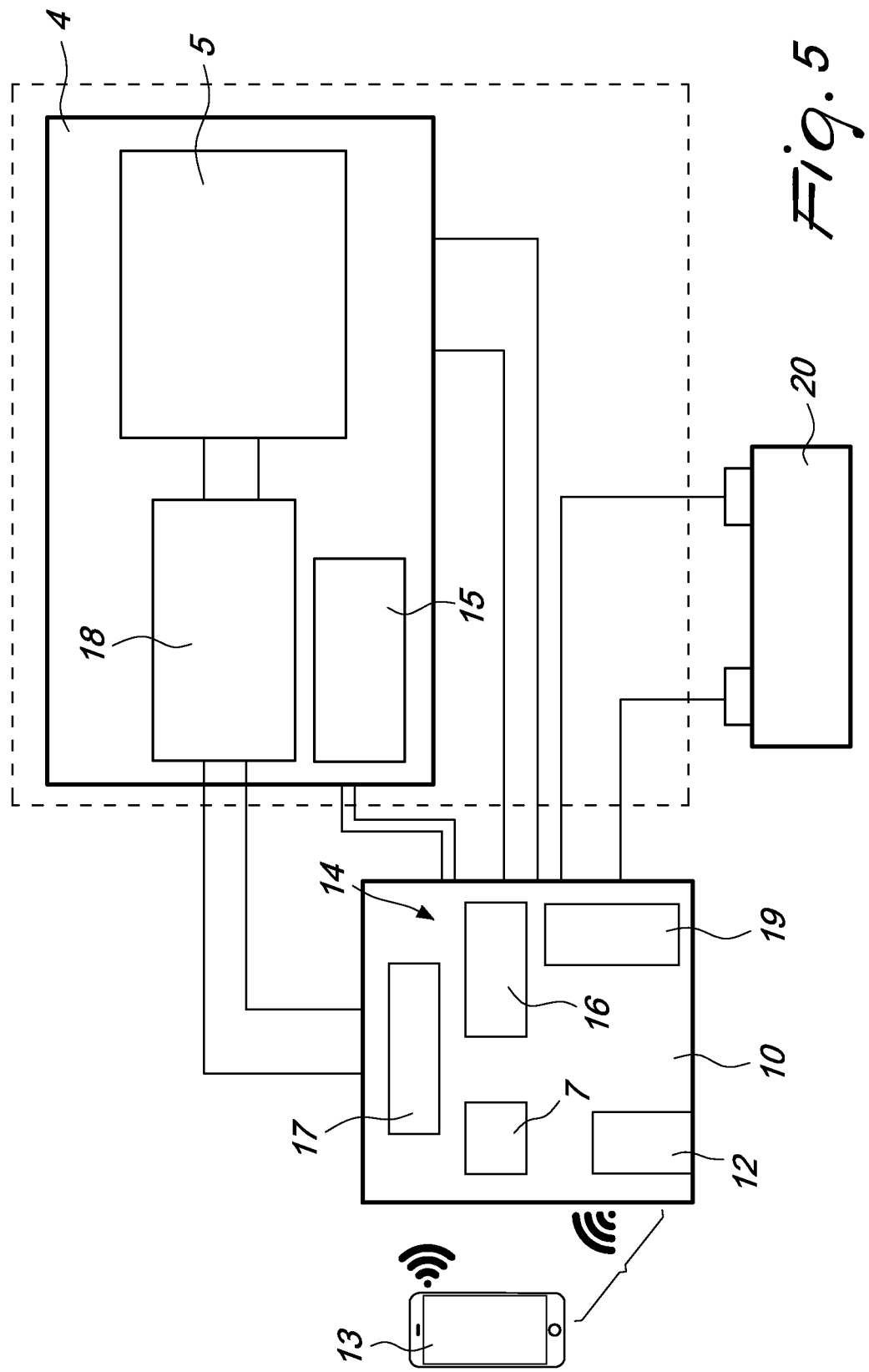

AUXILIARY DEVICE FOR PUMPS

The present invention relates to an auxiliary device for pumps.

As is known in systems for dispensing liquids, such as for example fuels, water or the like, pumps are used for circulating the liquid in the system.

In these systems a flowmeter is usually also installed, i.e. a device capable of measuring the flow rate and therefore the quantity of liquid that is dispensed by the apparatus.

Normally the flowmeters used are of the mechanical type and have a body in which there is a window through which an indicator of the quantity of liquid dispensed can be read.

Digital flowmeters are also known, which have, in the flowmeter body, a digital display for showing the quantity of liquid dispensed.

Flowmeters of this type make it possible therefore for the user to read the values measured by them only when the user is positioned in front of the flowmeter.

There are however situations when the flowmeter is positioned in parts of the system that are difficult for the user to access.

Furthermore, conventional flowmeters perform solely the function of indicating the values of the quantity of liquid dispensed by the pump and they do not make it possible to execute checks on the general operating status of the pump itself.

The aim of the present invention is to provide an auxiliary device for pumps that is capable of improving the known art in one or more of the above mentioned aspects.

Within this aim, an object of the invention is to provide an auxiliary device for pumps that enables the user to easily carry out the control and monitoring of the dispensing of liquid by the pump as well as the operating status of the pump, in order to avoid the risk of malfunctions in the pump.

Another object of the invention is to provide an auxiliary device for pumps that makes it possible to conduct control of accesses by users to the system in which the pump is installed.

A further object of the present invention is to overcome the drawbacks of the background art in a manner that is alternative to any existing solutions.

Another object of the invention is to provide an auxiliary device for pumps that is highly reliable and relatively easy to provide, so as to also be competitive from a purely economic viewpoint.

This aim and these and other objects which will become better apparent hereinafter are achieved by an auxiliary device for pumps according to claim 1, optionally provided with one or more of the characteristics of the dependent claims.

Further characteristics and advantages of the invention will become better apparent from the detailed description that follows of a preferred, but not exclusive, embodiment of the auxiliary device for pumps according to the invention, which is illustrated by way of non-limiting example in the accompanying drawings wherein:

FIG. 1 is a perspective view of the device according to the invention;

FIG. 2 is a front elevation view of the device according to the invention;

FIG. 5 is a diagram of the device according to the invention, applied to a pump.

Figure 3:
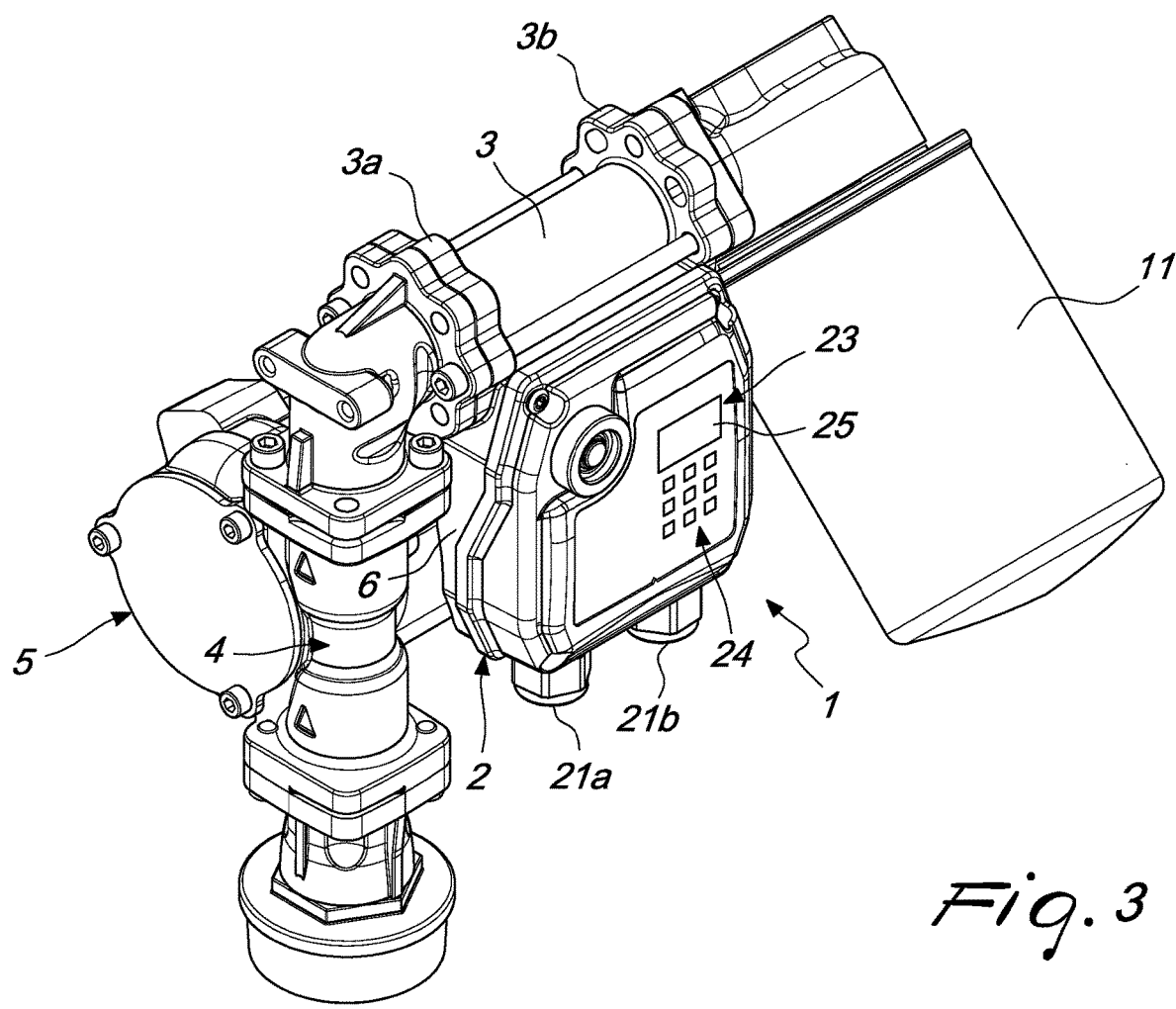
FIG. 3 is a perspective view of the device according to the invention, applied to a pump.
Figure 4:
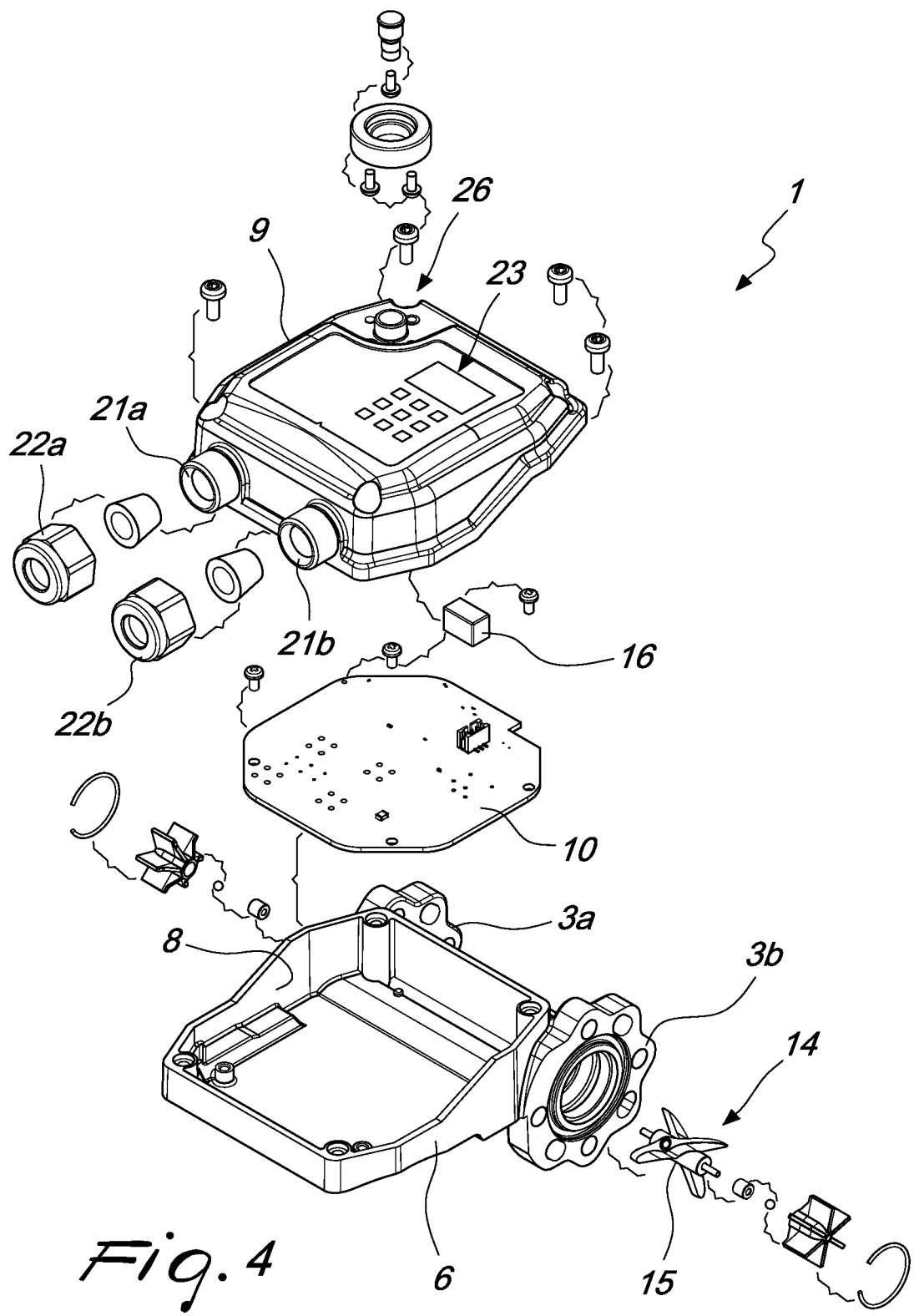
FIG. 4 is an exploded perspective view of the device according to the invention.

With reference to the figures, the auxiliary device for pumps according to the invention, generally designated by the reference numeral 1, comprises a device body 2, in which there are defined a conveyance duct 3, which can be connected to the delivery of a pump 4 driven by an electric motor 5, and at least one accommodation portion 6 for an electronic controller 7, constituted preferably by a microprocessor, which is connected to at least one sensor for detecting at least one operating parameter correlated to the operation of the pump 4.

Conveniently, the accommodation portion 6 defines a compartment 8, which is advantageously closed by a lid 9.

Preferably, the electronic controller 7 is arranged on an electronic board 10, located inside the compartment 8.

Conveniently, the conveyance duct 3 has, at one end, a first flange 3a, for its connection to the pump 4, and, at its opposite end, a second flange 3b, for its connection to the delivery line of a system for dispensing a liquid or to at least a component of the latter, such as, for example, a filter 11, a pipe and the like.

Preferably, the body 2 is provided in a single piece of metallic material, such as, for example, die-cast aluminum, in which both the conveyance duct 3 and the accommodation portion 6 are integrally defined.

Also according to the invention, the electronic controller 7 is connected functionally to a short-range wireless communication unit 12, which can be configured to communicate with at least one mobile device 13, such as, for example, a smartphone or a tablet computer, operated by a user, in order to allow the transmission of data between the mobile device 13 and the electronic controller 7 and, therefore, enable the user of the mobile device 13 to keep the operation of the pump 4 monitored.

Advantageously, the (or each) mobile device 13 that is enabled to receive or send data to the electronic controller 7, by way of the short-range wireless communication unit 12, is provided with an adapted app designed for mobile devices that allows the implementation of a graphical interface that enables the user to interact with the auxiliary device according to the invention.

The short-range wireless communication unit 12 is preferably of the Bluetooth type and comprises a Bluetooth communication antenna mounted on the electronic board 10 and capable of communicating with a Bluetooth antenna installed on the mobile device 13.

Advantageously, the auxiliary device according to the invention comprises a flow-rate sensor 14 of the liquid dispensed by the pump 4, which preferably comprises a turbine 15, which is arranged axially inside the conveyance duct 3 and is made to rotate by the passage of the liquid through the conveyance duct 3.

The flow rate sensor 14 further comprises a detector 16 of the rotation of the turbine 15, which is connected to the electronic controller 7 and is, advantageously, installed on the same electronic board 10 as the electronic controller 7.

More specifically, the turbine 15 is provided with magnetic means, which are constituted, preferably, by one or more permanent magnets, while the detector 16 is, advantageously, constituted by a transducer, which is constituted, conveniently, by a Reed ampoule or by a Hall effect sensor, arranged on the electronic board 10 in a position facing the region where the turbine 15 is so that it can interact with the permanent magnets associated with that turbine.

Conveniently, the electronic controller 7 can also be connected to a temperature sensor of the electric motor 5.

Such temperature sensor can be constituted, advantageously, by a signal detector 17, which is also arranged on the electronic board 10 and is capable of detecting the signals originating from a thermistor 18, which is associated with the electric motor 5. For example, the thermistor 18 can be constituted, as usual, by an NTC thermistor, typically installed at the brush holder board of the electric motor 5, and, in such case, the signal detector 17 will be constituted by a dedicated sensor which is connected, for example, by transmission cables, to the thermistor NTC.

Advantageously, the auxiliary device according to the invention is further provided with a semiconductor power switch 19 which can be interposed along the electrical connection between the electric motor 5 and the electric power source 20 of the electric motor 5, so as to allow the control of the electric power supply of the electric motor 5.

More specifically, the semiconductor power switch 19 is, conveniently, arranged on the electronic board 10 and is driven by the electronic controller 7, on the basis of the signals of the sensors connected to that electronic controller.

The connection between the electric power source 20 and the electric motor 5 is achieved, conveniently, with cables provided with eyelets that are connected to the electrical board 10 using threaded metallic pins.

In more detail, in the device body 2 and, more preferably, in the lid 9, there are two cable glands, conveniently provided with respective cable clamps 22a, 22b, and, more specifically, at least one first cable gland 21a for the entry into the compartment 8 of a first electrical cable, which electrically connects the electric power source 20 with the electronic board 10, and a second cable gland 21b, for a second electrical cable which, in turn, enables the powering of the electric motor 5 and which extends from the electronic board 10 to the electric motor 5.

On the auxiliary device there can also be user interface means 23, which are supported by the device body 2 and, more specifically, by the lid 9 and are functionally connected to the electronic controller 7, which make it possible to provide an auxiliary interface for exchanging data between the electronic controller 7 and the user, in addition to the data transmission between the mobile device 13 and the electronic controller 7 operable using the short-range wireless communication unit 12.

For example, such user interface means 23 can comprise a keypad 24 and/or a display 25.

Advantageously, the user interface means can further comprise signaling means, constituted conveniently by variable-color LEDs for issuing messages, reports and/or alarms relating to the status of operation of the device or of the pump.

Advantageously, on the device body 2 there are, likewise, authentication means 26 which are adapted to recognize the user or users authorized to interact with the pump 4.

For example, the authentication means 26 comprise an iButton device reader, per se known, which is configured to detect and recognize iButton devices in the possession of authorized users.

In particular, each iButton device is assigned to a respective authorized user and, as is known, substantially takes the form of a USB key which has a chip containing a code that uniquely identifies the iButton device.

Advantageously, in the electronic board 10 there are, in such case, data storage means, constituted by a local memory, connected to the electronic controller 7, in which the unique identification codes contained in the iButton devices of each authorized user are stored.

The authentication of the authorized users can be performed by the users themselves, including by operating on the corresponding mobile devices 13, using the graphical interface implemented by the dedicated app installed on the mobile devices 12 and the data transmission between the electronic controller 7 of the auxiliary device according to the invention and the mobile devices 13, provided using the short-range wireless communication unit 12.

To execute the installation of the auxiliary device according to the invention on a pump 4 that is already in use, the conveyance duct 3 can be connected to the delivery of the pump 4, through the first flange 3a, and to the existing pipes of the system in which the pump 4 is located, through the second flange 3b.

Then the electrical connection of the auxiliary device according to the invention with the electric power source 20 and with the electric motor 5 is performed as mentioned above.

Then the short-range wireless connections between the mobile devices 13 of the users and the auxiliary device according to the invention are configured.

The predefined switch on board the electric motor 5 is moved to the "on" position, so that the enabling of the operation of the electric motor 5 can be driven exclusively by the electric controller 7 using the semiconductor power switch 19.

The operation of the auxiliary device, according to the invention, is the following.

The user, using the app installed on his/her mobile device 13, authenticates his/her identity in order to obtain clearance to receive information about the operation of the pump 4 from the electronic controller 7.

Once the pump 4 is activated by the user, by sending a command to open the semiconductor power switch 19 to the electronic controller 7 using the mobile device 13, then, when the liquid dispensed by the pump 4 passes through the conveyance duct 3, the turbine 15 is made to rotate and the interaction between the magnetic field generated by the permanent magnets associated with the turbine 15 with the detector 16 arranged on the electronic board 10 generates a digital signal which is processed by the electronic controller 7.

Based on the signal originating from the detector 16, the electronic controller 7 sends, using the short-range wireless communication unit 12, to the mobile device 13 in possession of the user, information relating to the flow rate dispensed by the pump 4 which will be visible to that user on the graphical interface implemented by the app installed on his/her mobile device 13.

The user is therefore capable of monitoring the dispensing status of the liquid by the pump 4 and of intervening if required to switch the pump 4 off, by using the mobile device 13 to send a command to the electronic controller 7 which issues a close command to the semiconductor power switch 19, once the desired quantity of liquid has been dispensed by the pump 4 or if, from the data on the dispensed flow rate, the user deems there are problems with the circulation of the liquid in the system in which the pump is installed.

The electronic controller 7 can also receive, through the signal detector 17, data relating to the temperature of the electric motor 5 originating from the thermistor 18 installed on the motor.

In this manner, the electronic controller 7 is capable of controlling the temperature of the electric motor 7 and, in the event of overheating, it can drive the semiconductor power switch 19 and command the cutoff of the electric power supply of the motor and its shutdown.

The intervention of the electronic controller 7 on the electric motor 5 is reported to the user through the app installed on his/her mobile device 13.

The user can also interact with the auxiliary device according to the invention through the user interface means 23, after having authenticated his/her identity using the authentication means 26.

In practice it has been found that the invention fully achieves the intended aim and objects by providing an auxiliary device that, once installed on a pump already in use, makes it possible to remotely control the pump already in use, by allowing an exchange of data and information relating to the operating status of the pump with a mobile device in possession of the user.

The invention thus conceived is susceptible of numerous modifications and variations, all of which are within the scope of the appended claims. Moreover, all the details may be substituted by other, technically equivalent elements.

In practice, the materials used, as well as the contingent shapes and dimensions, may be any according to the requirements and to the state of the art.

The disclosures in Italian Patent Application No. 102022000011156 from which this application claims priority are incorporated herein by reference.

What is claimed is:

1. An auxiliary device for pumps, comprising a device body which defines a conveyance duct, which is configured to be connected to a delivery of a pump driven by an electric motor, and at least one accommodation portion;
    an electronic controller which is accommodated in said accommodation portion and which is connected to at least one sensor for detecting at least one operating parameter correlated to an operation of said pump,
    a short-range wireless communication unit accommodated in said accommodation portion; and
    at least one mobile device operated by a user and configured to communicate with said short-range wireless communication unit;
    said electronic controller being configured to drive a semiconductor power switch interposed between said electric motor and an electric power source of said electric motor by means of at least one mobile device operated by a user; and
    further comprising, on said device body, authentication means which are adapted to recognize users authorized to operate on said pump.

2. The device according to claim 1, wherein the at least one sensor comprises a flow rate sensor of a liquid dispensed by said pump.

3. The device according to claim 2, wherein said flow rate sensor comprises a turbine which is arranged axially in said conveyance duct and a detector of a rotation of said turbine.

4. The device according to claim 3, wherein said electronic controller is arranged on an electronic board which is accommodated in a compartment defined in said at least one accommodation portion.

5. The device according to claim 4, wherein said turbine is provided with magnetic means, said detector comprising a transducer which interacts with said magnetic means and is mounted on said electronic board.

6. The device according to claim 4, wherein said electronic controller is connected to a temperature sensor of said electric motor.

7. The device according to claim 6, wherein said temperature sensor comprises a signal detector which is arranged on said electronic board and is adapted to read signals arriving from a thermistor associated with said electric motor.

8. The device according to claim 1, further comprising user interface means which are supported by said device body.

* * * * *